United States Patent Office 3,574,076
Patented Apr. 6, 1971

3,574,076
CONVERSION OF UNSATURATED HYDROCARBONS IN THE PRESENCE OF A CATALYST AND ULTRAVIOLET RADIATION
Francis William Kirsch, Wayne, Pa., assignor to Sun Oil Company, Philadelphia, Pa.
No Drawing. Filed Oct. 27, 1967, Ser. No. 678,544
Int. Cl. B01j 1/10
U.S. Cl. 204—162                                              9 Claims

ABSTRACT OF THE DISCLOSURE

A method of increasing the conversion of reactants when reacting hydrocarbons such as aromatics, alkenes, aryl alkenes, etc., which absorb ultraviolet radiation; said method consists of subjecting the reactants to the influence of a Group VIII metal supported on a refractory inorganic oxide carrier and ultraviolet radiation.

This invention relates to catalyst systems, and more particularly, to catalyst systems which are photosensitive for greater activity.

For many years it has been the object of the chemical industry to provide improved catalyst systems which tend to increase the conversion of reactants. These improved catalysts are exceptionally desirable in the petroleum industry which has been transformed almost entirely into a series of catalytic processes, such as cracking, polymerization, alkylation, etc. Of particular note is the interest in catalytic activity in the art of hydrogenation, that is, the saturation of olefinic or aromatic bonds without any significant reduction in the molecular weight by cracking. A large number of active catalysts have previously been employed in this field as are disclosed by Kozlowski et al. in U.S. Pat. No. 3,256,175 and by Aftandilian in U.S. Pat. No. 3,288,725.

It has now been discovered that substantially complete conversion of reactants can be obtained when a catalytic reaction occurs in the presence of ultraviolet radiation. Heretofore, may attempts have been made to enhance the activity of catalysts by subjecting them to varied sources of radiation. A discussion of the prior research in this field has been given by E. H. Taylor in his article "Radiation Effects on Solids, Including Catalysts," in Journal of Chemical Education, 36, 396 (1959). Also known in the art is the high energy irradiation of platinum and palladium catalysts as disclosed by Graham in U.S. Pats. Nos. 3,189,560 and 3,189,561. Of further note is an article by Messrs. Farmer and Parker, "The Effect of Ultraviolet Light upon the Catalytic Activity of Colloidal Platinum," Journal of the American Chemical Society, 35, pp. 1524–7 (1913), which discloses the destruction of the catalytic effect of platinum in the presence of ultraviolet light. The hydrogenation catalyst zinc oxide has also been shown to have a decreased activity after subjection to gamma radiation.

It is therefore an object of this invention to provide a novel, active catalyst system.

It is a further object of this invention to provide a catalyst-reactant system which is photosensitive.

More particularly, it is an object of this invention to provide a catalyst system for the substantially complete hydrogenation of unsaturated hydrocarbons.

Further objects of the invention will become apparent as the invention is more fully disclosed.

In accordance with the objects of this invention, it has been found that catalysts consisting of Group VIII metals, when supported on refractory inorganic oxide carriers and employed in the presence of ultraviolet radiation, yield substantially larger conversions to the desired final product than catalysts acting absent the ultraviolet radiation. Particularly, when hydrogen passes over an unsaturated hydrocarbon in the presence of the aforesaid catalysts and ultraviolet radiation, such as is emitted from a high-intensity mercury lamp, substantially complete saturation of the hydrocarbon occurs. This aspect of the invention can be particularly useful in cleaning up refined products which exhibit problems in color stability or in oxidative ability traceable to their unsaturation.

Although the mechanism behind this phenomenon is not fully known, it is believed that the radiation produces electronic excitation when the energy emitted from the lamp is absorbed by the molecule. This excitation creates an additional perturbation for the molecules which are or can be perturbed by a catalyst, and aids in weakening the carbon bonds and rendering them more receptive toward possible reactants.

The hydrocarbons and substituents thereof on which the improved catalyst system will show beneficial effects are those compounds which have been shown to absorb radiation in the ultraviolet range. The compounds of this nature are well known in the art as disclosed in Organic Chemistry, Cram, D. J. and Hammond, G. C., McGraw-Hill, N.Y., 1959, pp. 613–624. Included in such compounds are mono- and polycyclic aromatics, acetylene, alkenes, alkyl halides, ketones, etc. Preferable compounds are those hydrocarbons which preferentially absorb radiation above the 200 m$\mu$ range. Examples of said preferred compounds are benzene, naphthalene, vinyl acetylene, aryl alkenes, conjugated alkenes, nitroalkenes, etc. Compounds which preferentially absorb radiation below 200 m$\mu$ are difficult to influence due to the absorption by oxygen of the wave lengths. It should be noted that these compounds which absorb below 200 m$\mu$ can be influenced by creating a vacuum between the ultraviolet source and the reactants.

As stated previously, any Group VIII metal which is supported on refractory inorganic oxide carried such as silica, alumina, magnesia, boria, zirconia etc. will have an improved catalytic effect when employed in conjunction with ultraviolet radiation. The preferred catalysts of this invention are platinum supported on alumina and nickel supported on silica. Preferably the aforementioned catalysts contain 0.25–2% by weight platinum and 1–10% by weight nickel respectively and also are in particulate form. The catalysts can be readily prepared by any of the methods which are well known in the art.

The specific reaction conditions of temperature, flow rates, quantity of charge, catalyst, etc., for complete saturation will vary for the particular hydrocarbon to be hydrogenated and the catalyst employed. However, it has been found that with this novel catalyst system atmospheric pressure and low temperatures can be employed, resulting in substantial saturation of the charged compound. Since extremely high pressures are normally employed in completely hydrogenating unsaturates in the petroleum industry, the advantage of employing this novel catalyst in industry can readily be appreciated.

EXAMPLE I

Benzene was hydrogenated over 3.83 grams of a nickel on silica catalyst which had been ground through 325-mesh (43$\mu$) and supported on a fritted disc in the bottom of a vertical quartz reactor. Benzene was vaporized by passing hydrogen through a constant-temperature benzene reservoir. In the reactor, gas flow was upward through an agitated, but not fully fluidized, bed of catalyst. Runs were made at approximately 56° C., and at atmospheric pressure, with a liquid hourly space velocity (volume liquid charged/volume catalyst×hour) of 0.28 hour$^{-1}$ and a hydrogen to benzene mol ratio of 20.2.

Reactions were carried out in the presence of U.V. and in darkness. The run made in the presence of an ultraviolet source employed a Hanovia mercury lamp, a trademark product of the National Electric Instrument Division, Englehard-Hanovia, Inc., which was situated approximately 1.75 inches from the reactor. Without the lamp, reactor temperature was maintained by wrapping a heating tape and insulation around the catalyst bed. The final analysis showed that the product obtained with the ultraviolet radiation contained 98.5% by volume cyclohexane, whereas the unradiated product contained 87% by volume cyclohexane.

EXAMPLE II

The same method and conditions of Example I were employed; however, the catalyst used in this example was platinum on an alumina support. Reactions were again carried out in darkness and in the presence of U.V. light. Analysis showed 98.5% by volume cyclohexane in the product when radiation was present, and only 58% by volume cyclohexane when the reaction was carried out in darkness.

EXAMPLE III

The same method and conditions of Example I are employed, however the hydrocarbon charge is naphthalene. Reactions are again carried out in darkness and in the presence of ultraviolet light. Analysis shows substantially greater conversion to decahydronaphthalene in the ultraviolet light than in darkness.

EXAMPLE IV

The same method and conditions of Example I are employed, however, the hydrocarbon charge is butadiene. Greater conversion to butane is found with the ultraviolet light than without.

EXAMPLE V

In order to fully appreciate the impact of the ultraviolet radiation, reactions were carried out under different conditions using the method of Example I. A benzene charge and a nickel-silica catalyst were again employed. It should be noted that the conditions inherently prevented complete saturation. The results of these reactions at atmospheric pressure are shown in Table I.

TABLE I

| | Run No. | | | |
|---|---|---|---|---|
| | 1 | 2 | 3 | 4 |
| Ml. catalyst | 1.95 | .95 | 1.95 | 19.5 |
| U.V | yes | no | yes | no |
| L.H.S.V.[1] | 1.28 | 1.28 | 1.28 | 1.28 |
| $H_2/\phi H$ (molar) | 25.4 | 25.4 | 25.4 | 25.4 |
| Temp. °C | 46 | 46 | 45 | 46 |
| Cyclohexane in product (vol. percent) | 25.5 | 15.0 | 26.5 | 12.5 |

[1] Liquid hourly space velocity.

From the examples cited, the beneficial effect given by this novel catalyst system is easily comprehended. Although the examples are specifically pointed to catalysis with hydrogen, other reactants such as oxygen, nitrogen and halogens will also be induced to act with this more active catalyst system, as will reactions such as polymerization, crackling, etc., which employ just a hydrocarbon.

While the particular compositions and methods of application described herein are well adapted to meet the objects of the present invention, various modifications or changes may be resorted to without departing from the scope of the invention as defined in the claims.

I claim:

1. In the method of catalytically hydrogenating unsaturated hydrocarbons, the improvement which comprises increasing conversion of reactants to hydrogenated product by contacting with hydrogen a hydrocarbon that absorbs ultraviolet radiation, said method being carried out at essentially atmospheric pressure for a time sufficient to substantially saturate said hydrocarbon, in the presence of a catalyst comprising a Group VIII metal supported on a refractory inorganic oxide and in the presence of ultraviolet radiation above 200 millimicrons.

2. A method as described in claim 1 wherein the reaction occurs at atmospheric pressure.

3. A method as described in claim 1 wherein said metal supported on said carriers is selected from the group consisting of nickel on silica and platinum on alumina.

4. A method as described in claim 1 wherein the hydrocarbon reactant preferentially absorbs radiation above 200 m$\mu$.

5. A method as described in claim 4 wherein the hydrocarbon is selected from the group consisting of aromatics, alkenes and aryl olefins.

6. A method as described in claim 4 wherein the hydrocarbon is benzene.

7. A method of hydrogenating benzene which comprises passing hydrogen over benzene in the presence of ultraviolet light above 200 millimicrons and a Group VIII metal supported on a refractory inorganic oxide carrier.

8. The method as described in claim 7 wherein said metal supported on a carrier is selected from the group consisting of nickel supported on silica and platinum supported on alumina.

9. The method as described in claim 7 wherein the reaction occurs at atmospheric pressure.

References Cited

UNITED STATES PATENTS

| 2,150,657 | 3/1939 | Mitscherling | 204—162 |
| 2,437,531 | 3/1948 | Huffman | 204—162 |
| 3,119,875 | 1/1964 | Steinmetz | 204—162X |
| 3,122,586 | 2/1964 | Berndt et al. | 204—162X |
| 3,324,018 | 6/1967 | Fotis et al. | 204—162 |

BENJAMIN R. PADGETT, Primary Examiner